United States Patent
Hannan (10) Patent No.: US 10,674,408 B2
(45) Date of Patent: Jun. 2, 2020

(54) METHOD AND SYSTEM FOR FREQUENCY ALLOCATION IN A SHARED ACCESS SYSTEM

(71) Applicant: CommScope Technologies LLC, Hickory, NC (US)

(72) Inventor: Ariful Hannan, Sterling, VA (US)

(73) Assignee: CommScope Technologies LLC, Hickory, NC (US)

( * ) Notice: Subject to any disclaimer, the term of this patent is extended or adjusted under 35 U.S.C. 154(b) by 21 days.

(21) Appl. No.: 15/977,767

(22) Filed: May 11, 2018

(65) Prior Publication Data

US 2019/0174359 A1 Jun. 6, 2019

Related U.S. Application Data

(60) Provisional application No. 62/594,581, filed on Dec. 5, 2017.

(51) Int. Cl.
*H04W 28/20* (2009.01)
*H04W 72/04* (2009.01)
(Continued)

(52) U.S. Cl.
CPC ........... *H04W 28/20* (2013.01); *H04W 16/10* (2013.01); *H04W 16/14* (2013.01);
(Continued)

(58) Field of Classification Search
CPC ............. H04W 28/20; H04W 72/0493; H04W 72/0453; H04W 16/10; H04W 16/14; H04W 88/10
See application file for complete search history.

(56) References Cited

U.S. PATENT DOCUMENTS

2014/0328294 A1 11/2014 Malkov et al.
2016/0044687 A1 2/2016 Mueck et al.
(Continued)

FOREIGN PATENT DOCUMENTS

WO 2016195751 A1 12/2016

OTHER PUBLICATIONS

"Requirements for Commercial Operation in the U.S. 3550-3700 MHz Citizens Broadband Radio Service Band", Wireless Innovation Forum, Feb. 3, 2017, pp. 1-73, Version V2.0.0, The Software Defined Radio Forum Inc.
(Continued)

*Primary Examiner* — Shailendra Kumar
(74) *Attorney, Agent, or Firm* — Fogg & Powers LLC (57) ABSTRACT

A method of allocating bandwidth to co-existence groups of a connected set in a spectrum access system (SAS) is provided. The method comprises: receiving data about co-existence groups in the connected set of the SAS, where such data includes a number of the co-existence groups, G, in the connected set, and a number of radios, $n_i$, in each co-existence group; determining an allocated bandwidth for each of the G co-existence group by subtracting a splitting disincentive bandwidth for a co-existence group from a co-existence incentive bandwidth for the co-existence group; and sending the determined allocated bandwidths for the co-existence groups.

20 Claims, 4 Drawing Sheets

100B (51) Int. Cl.
*H04W 88/10* (2009.01)
*H04W 16/14* (2009.01)
*H04W 16/10* (2009.01)

(52) U.S. Cl.
CPC ... *H04W 72/0453* (2013.01); *H04W 72/0493* (2013.01); *H04W 88/10* (2013.01)

(56) References Cited

U.S. PATENT DOCUMENTS

| | | | |
|---|---|---|---|
| 2017/0295578 A1* | 10/2017 | Khoshnevisan | H04L 5/0032 |
| 2018/0014304 A1* | 1/2018 | Khoshnevisan | H04W 24/08 |
| 2018/0376345 A1* | 12/2018 | MacMullan | H04W 16/14 |
| 2019/0059000 A1* | 2/2019 | Sun | H04W 16/14 |
| 2019/0141713 A1* | 5/2019 | Cimpu | H04W 72/10 |
| 2019/0222339 A1* | 7/2019 | Badic | H04B 17/336 |
| 2019/0335336 A1* | 10/2019 | Cimpu | H04W 16/10 |

OTHER PUBLICATIONS

International Searching Authority, "International Search Report and Written Opinion from PCT Application No. PCT/US2018/061828 dated Mar. 8, 2019", from Foreign Counterpart to U.S. Appl. No. 15/977,767, pp. 1-9, Published: WO.

* cited by examiner

METHOD AND SYSTEM FOR FREQUENCY ALLOCATION IN A SHARED ACCESS SYSTEM

CROSS-REFERENCE TO RELATED APPLICATIONS

The present application claims benefit of U.S. patent application Ser. No. 62/594,581, filed Dec. 5, 2017; the entire contents of the aforementioned patent application is incorporated herein by reference as if set forth in its entirety.

BACKGROUND

Shared spectrum usage by governmental and commercial users has been proposed, e.g. for Citizens Broadband Radio Service (CBRS) specified by the United States Federal Communications Commission (FCC). With shared spectrum usage, a multitude of wireless service providers may utilize such spectrum. Each service provider would employ a system of citizens broadband radio service device(s) (CBSD(s)), e.g. that would facilitate communications with user equipment. The system's CBSDs would be coupled to other networks, such as the Internet, e.g. by a core network.

To encourage frequency allocation efficiency, groups of service providers using a shared access system (SAS) are encouraged to form co-existence groups of CBSDs in a connected set. The CBSDs of the co-existence groups use shared frequency spectrum, and are controlled by the SAS. A connected set means a set of co-existence groups each of which includes CBSD(s) that are allocated the same shared frequency spectrum and are capable of interfering with one another. One or more co-existence groups in a connected set may use different radio access technologies (RATs), where the different RATs have different air interfaces, e.g. as described below.

An interference management policy governs how CBSDs are configured and their transmissions are coordinated to reduce interference amongst CBSDs. A co-existence group means a group of CBSDs which are operated using an interference management policy to mitigate interference amongst the CBSDs in the co-existence group, even if the CBSDs are operated by different service providers. Interference mitigation is desirable because it permits more CBSDs to operate in a frequency spectrum utilized by a SAS.

Typically, the CBSDs in a co-existence group utilize a common RAT with common parameters. For example, CBSDs of a coexistence group with Long Term Evolution (LTE) time division duplexing (TDD) RAT will synchronize their frame timings and the configuration of their uplink/downlink (UL/DL) sub-frame. If the RAT is different between different CBSDs within the connected set, e.g. when using LTE RAT, the CBSDs may not be time synchronized or have the same UL/DL sub-frame configurations. Therefore, a guard band is necessary to avoid interference between adjacent channels.

Each co-existence group would be assigned at least one frequency sub-band within the shared frequency spectrum managed by the SAS. Only CBSD(s) of general authorized access users which are part of the co-existence group would be permitted to operate in the at least one sub-band. Communications systems of incumbent users may also utilize the at least one sub-band.

Figure 1A:
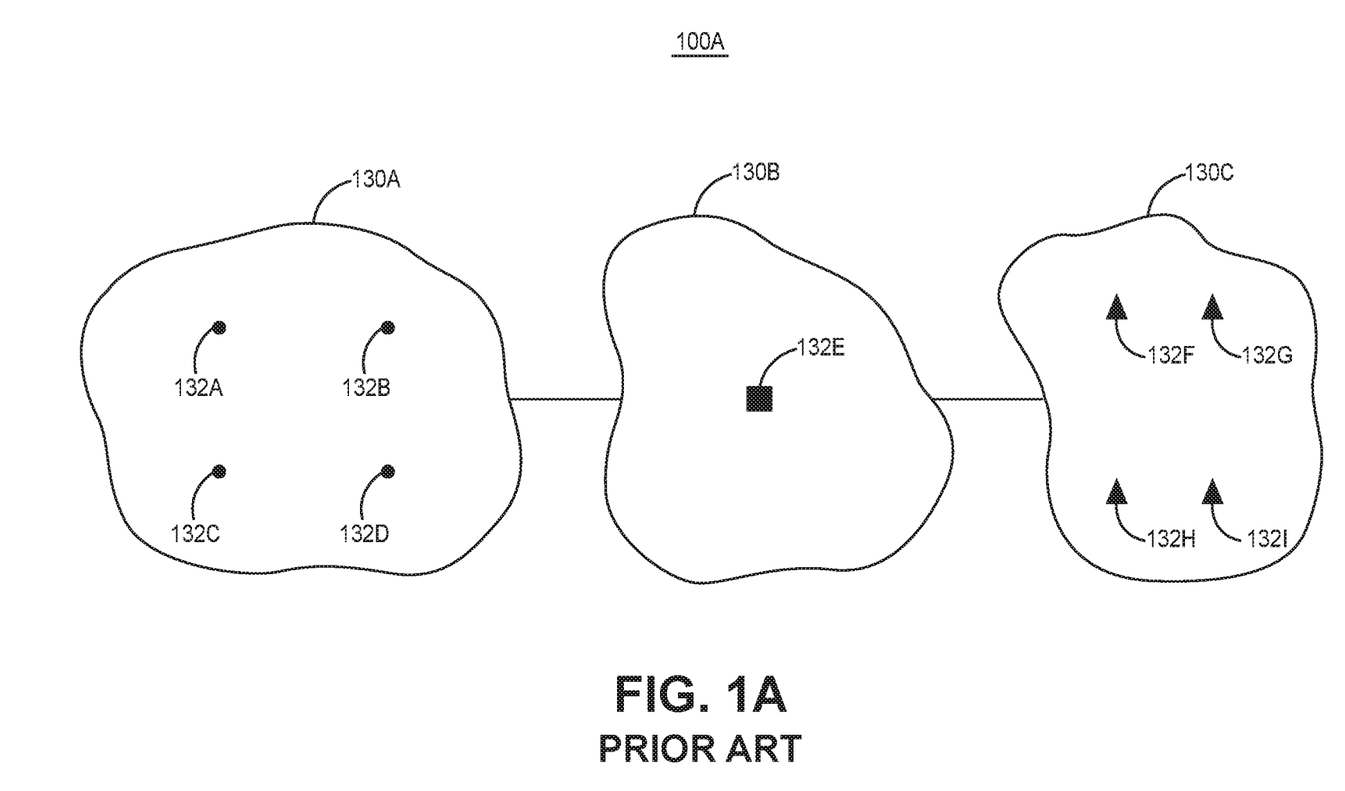
FIG. 1A illustrates a diagram of one embodiment of a connected set of CBSDs.

FIG. 1A illustrates a diagram of one embodiment of a connected set of CBSDs 100A. The connected set of CBSDs 100A comprises a first CBSD 132A, a second CBSD 132B, a third CBSD 132C, a fourth CBSD 132D, a fifth CBSD 132E, a sixth CBSD 132F, a seventh CBSD 132G, a eighth CBSD 132H, and a ninth CBSD 132I. These nine CBSDs can be segregated, as illustrated into a first co-existence group 130A, a second co-existence group 130B, and a third co-existence group 130C.

The first co-existence group consists of the first CBSD 132A, the second CBSD 132B, the third CBSD 132C, and the fourth CBSD 132D. The second co-existence group 130B consists only of the fifth CBSD 132E. The third co-existence group 130C consists of the sixth CBSD 132F, the seventh CBSD 132G, the eighth CBSD 132H and the ninth CBSD 132I. The lines connecting the first co-existence group 130A and the second co-existence group 130B, and the second co-existence group 130B and third co-existence group 130C respectively represent potential interference between the first co-existence group 130A and the second co-existence group 130B, and potential interference between the second co-existence group 130B, and the third co-existence group 130C. The potential interference is the interference created by one co-existence group that is potentially suffered by the other co-existence group. All of the CBSDs in FIG. 1A are part of a connected set of CBSDs 100A.

Larger co-existence groups have relatively more CBSDs than smaller co-existence groups. Generally, the larger co-existence groups require sub-bands (in the SAS shared frequency spectrum) having a larger bandwidth then the sub-bands of smaller co-existence groups. However, smaller co-existence groups require some nominal bandwidth. If there are many smaller co-existence groups, the many smaller co-existence groups may undesirably diminish the bandwidth of a larger co-existence group. Therefore, there is a need to fairly allocate sub-band bandwidth to encourage co-existence groups and to ensure frequency allocation efficiency.

SUMMARY OF THE INVENTION

A method of allocating bandwidth to co-existence groups of a connected set in a spectrum access system (SAS) is provided. The method comprises: receiving data about co-existence groups in the connected set of the SAS, where such data includes a number of the co-existence groups, G, in the connected set, and a number of radios, $n_i$, in each co-existence group; determining an allocated bandwidth for each of the G co-existence group by subtracting a splitting disincentive bandwidth for a co-existence group from a co-existence incentive bandwidth for the co-existence group; and sending the determined allocated bandwidths for the co-existence groups.

DETAILED DESCRIPTION

For pedagogical reasons, the invention described herein is illustrated with respect to a CBRS and CBSDs. However, the invention is applicable to other SASs which utilize radios (e.g. access points and/or base stations), but do not implement a CBRS with CBSDs. Radios are a more generalized form of CBSDs.

A technique for allocating bandwidth to co-existence groups in a connected set is described. The technique is neither solely dependent upon the number of CBSDs in a coexistence group, nor solely dependent upon the number of co-existence groups in the connected set. Alone, the former would incentivize large co-existence groups which obtain the gross majority of allocable sub-bandwidth to the disadvantage of smaller co-existence groups (in the same connected set). Alone, the latter incentivizes many co-existence groups in the connected set which results in diminished bandwidth for each of the co-existence groups, including for large co-existence groups. A large co-existence group means a co-existence group with a large number of CBSDs. A small co-existence group means a co-existence group with a small number of CBSDs, i.e. a smaller number of CBSDs than in a large co-existence group. Thus a large co-existence group has more CBSDs than a small co-existence group.

Also, radio channels of two different co-existence groups in a connected set must be separated by a guard band to avoid interference between the two co-existence groups. As the number of co-existence groups increases in a connected set, the amount of useable bandwidth decreases because more bandwidth is required for guard bands. Thus, while it is desirable to form co-existence groups in a connected set, too many small co-existence groups undermine frequency allocation efficiency.

To avoid this dilemma, a balanced bandwidth allocation technique is utilized. The balanced bandwidth allocated to a co-existence group in a connected set is determined by a co-existence incentive bandwidth function dependent upon the number of co-existence groups in the corresponding connected set, less a group splitting disincentive bandwidth that is a function of the number of CBSDs in the co-existence group. The splitting disincentive bandwidth reduces the bandwidth of smaller co-existence groups based upon the increased guard bandwidth required by the inclusion of such smaller co-existence groups. In one embodiment, the guard bandwidth depends upon receiver sensitivity.

The co-existence incentive bandwidth may be dependent upon parameters, in addition to the number of co-existence groups in the connected set, for example such as size of coverage area (e.g. RF coverage area) of each co-existence group, type of CBSD(s) in each co-existence group, maximum radiated or transmission power of CBSD(s) in each co-existence group, and/or the number of CBSDs in each co-existence group. Similarly, the group splitting disincentive bandwidth may be dependent upon parameters, in addition to the number of CBSDs in the co-existence group, for example such as the number of co-existence groups in each connected set, the size of coverage area (e.g. RF coverage area) of each co-existence group, the type of CBSD(s) in each co-existence group, and/or a maximum radiated or transmission power of the CBSD(s) in each co-existence group. For each of the co-existence incentive bandwidth and the group splitting disincentive bandwidth, unique weightings may be given to (a) each parameter used to determine those bandwidths (e.g. the number of co-existence groups and the number of CBSDs in each co-existence group, and/or (b) each term (e.g. co-existence incentive bandwidth and/or the group splitting disincentive bandwidth term) dependent upon any of such parameters. Optionally, to ensure that smaller co-existence group(s) do not have negligible or negative bandwidth due to larger co-existence groups which have a relatively very many more CBSDs, the smaller co-existence group(s) may receive at least a minimum bandwidth, e.g. of 5 MHz or 10 MHz.

The allocated bandwidth of each co-existence group does not have to necessarily equal a channel bandwidth for the corresponding radio access technology. For example, for long term evolution (LTE), if the allocated bandwidth is less than a channel bandwidth (i.e. 5 MHz, 10 MHz, or 15 MHz), then an eNodeB (e.g. a base station) can utilize a subset of resources blocks to implement the allocated bandwidth.

One example of an implementation of the balanced bandwidth allocation technique is illustrated below. The illustrated implementation incentivizes fewer co-existence groups, and disincentives groups with fewer CBSDs:

$$B_i = \left[\frac{B}{G}\right] - \left[B_g * \left\{\frac{2}{G} - \frac{n_i}{N}\right\}\right], \quad \text{(Equation 1)}$$

where $B_i$ is a bandwidth allocated to an ith co-existence group, $$\left[\frac{B}{G}\right]$$

is a co-existence incentive bandwidth,
$B = \Sigma_1^G B_i$, where B is a total bandwidth available to all co-existence groups in the connected set,
G is a total number of co-existence groups in the connected set,
$n_i$ is a number of CBSDs in an ith co-existence group,
N is a total number of CBSDs in the connected set,
$B_g$ is a total guard bandwidth, e.g. which is defined by the SAS, standard bodies, common industry practices, and/or is based upon the radio access technologies used in the co-existence groups in the connected set, and $$\left[B_g * \left\{\frac{2}{G} - \frac{n_i}{N}\right\}\right]$$

is an ith group splitting disincentive bandwidth.
Thus, as G increases, the co-existence incentive bandwidth declines for all co-existence groups in a connected set. For co-existence groups with a relatively small $$\frac{n_i}{N},$$

the group splitting disincentive bandwidth increases resulting in a relatively small bandwidth being allocated to such co-existence groups.

Another example of an implementation of the balanced bandwidth allocation technique is illustrated below. The illustrated implementation incentivizes co-existence groups having larger coverage areas, and disincentives groups with fewer CBSDs:

$$B_i = \frac{B}{2}\left\{\frac{1}{G} + \frac{A_i}{A}\right\} - \left[B_g * \left\{\frac{2}{G} - \frac{n_i}{N}\right\}\right], \quad \text{(Equation 2)}$$

where B, $B_g$, $B_i$, G, N, $n_i$, and the ith group splitting disincentive bandwidth are defined as specified above, $$\frac{B}{2}\left\{\frac{1}{G} + \frac{A_i}{A}\right\}$$

is an ith group splitting incentive bandwidth,
$A_i$ is a coverage area of the ith coexistence group, and
$A = \sum_i^G A_i$, where A is a total coverage area of all coexistence groups in the connected set.

Thus, when a coverage area $A_i$ for the ith coexistence group is larger than any other coverage areas of coexistence groups in the same connected set, the incentive bandwidth portion for the ith coexistence group is larger than for any other coexistence group in the same connected set. For co-existence groups with a relatively small $$\frac{n_i}{N},$$

the group splitting disincentive bandwidth increases resulting in a relatively small bandwidth being allocated to such co-existence groups.

A further example of an implementation of the balanced bandwidth allocation technique is illustrated below. Like the example immediately above, the illustrated implementation incentivizes co-existence groups having larger coverage areas, and disincentives groups with fewer CBSDs. Different weightings, w1 and w2, can be assigned to the two terms comprising the group splitting incentive bandwidth. However, in Equation 2, the weightings are equal: w1=w=½.

The portion of equation (2) representing the coexistence incentive bandwidth can be generalized by assigning different weights to the $$\left[\frac{B}{G}\right] \text{ and } \left(B * \frac{A_i}{A}\right)$$

terms:

$$\left\{\frac{B}{G} * w1 + \left(B * \frac{A_i}{A}\right) * w2\right\}, \quad \text{(Equation 3)}$$

Thus, like Equation (2), the illustrated implementation incentivizes co-existence groups having larger coverage areas, and disincentives groups with fewer CBSDs:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right], \quad \text{(Equation 4)}$$

where $$\left\{\frac{B}{G} * w1 + \left(B * \frac{A_i}{A}\right) * w2\right\}$$

is an ith group splitting incentive bandwidth, w1+w2=1, and the other parameters are defined as specified above.

Thus, as for Equation (2), when a coverage area $A_i$ for the ith coexistence group is larger than any other coverage areas of coexistence groups in the same connected set, the incentive bandwidth portion for the ith coexistence group is larger than for any other coexistence group in the same connected set. However, the affect on group splitting incentive bandwidth of the ratio (of the coverage area of a co-existence group with respect with respect to the total coverage area) and $$\frac{B}{G}$$

may be varied by changing weightings w1 and w2. Further, for co-existence groups with a relatively small $$\frac{n_i}{N},$$

the group splitting disincentive bandwidth increases resulting in a relatively small bandwidth being allocated to such co-existence groups.

Figure 1B:
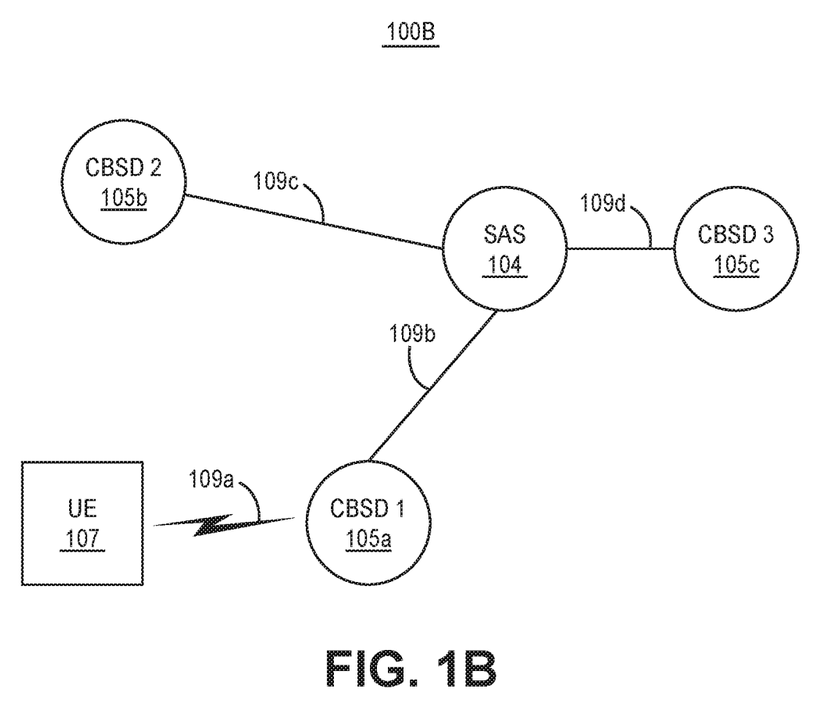
FIG. 1B illustrates a diagram of one embodiment of a citizens broadband radio service system.

CBSDs may be deployed by one or more wireless service providers using frequency spectrum that is shared by the CBSDs. FIG. 1B illustrates a diagram of one embodiment of a citizens broadband radio service system 100B. The illustrated SAS 100B is a CBRS comprising a SAS control system 104 coupled to a first CBSD (CBSD 1) 105a, a second CBSD (CBSD 2) 105b, and a third CBSD (CBSD 3) 105c.

The SAS control system 104 controls CBSD access to the shared frequency spectrum and will be subsequently described in more detail. User equipment 107, e.g. a portable device such as a handset, a phablet, a tablet, or a laptop, wirelessly communicates with the first CBSD 105a over a first communications link 109a using a portion of the shared spectrum in which the operation of CBSDs is controlled, or regulated, by the SAS control system 104. For purposes of clarity, the term 'user' used in 'user equipment' refers to a user that is different than the GAA user and the incumbent user; it is the user of the user equipment communicating with the first CBSD 105a. In one embodiment, the CBSDs and user equipment may utilize a Long Term Evolution (LTE), 5G, IEEE802.11 compliant, IEEE802.16 compliant, and/or any other air interfaces.

The first CBSD 105a, the second CBSD 105b, and the third CBSD 105c are respectively coupled to the SAS control system 104 by a second communications link 109b, a third communications link 109c, and a fourth communications link 109d. Such communications links may be any type of wireless and/or wired communications links, e.g. a WiMAX communications links, an optical fiber communications link, an Ethernet communications link, and/or any other type of communications link.

The SAS control system 104 may control the operation of numerous other CBSDs in the shared frequency spectrum, and the operational characteristics of such other CBSDs. The SAS manages the operation of CBSDs in the shared frequency spectrum so that such CBSDs do not interfere with one another and with incumbent user(s)' communications system(s). The CBSDs comprise CBSDs of priority access licensees (PALs) and general authorized access users.

Incumbent users have first, or highest, priority to utilize the shared frequency spectrum. Thus, incumbent user(s)' communications system(s) shall be able to operate free of interference from other user(s)' communications system(s), e.g. communications systems of priority access licensees and general authorized access users. Free of interference as used herein does not mean an absence of interference, but rather means an acceptable level of interference which may be no interference or a finite level of interference. The acceptable level of interference may vary by geography, frequency spectrum, user type, license type, and/or other indicia. In one embodiment, the incumbent users include government operators of communications systems, operators of fixed satellite communications systems, and grandfathered, prior licensees of the spectrum. Communications systems, as used herein, shall include RADAR.

In one embodiment, PALs have second, or intermediate, priority, after incumbents, to utilize the frequency spectrum controlled by the SAS control system 104. In another embodiment, a PAL shall be able to operate, when incumbent users are free of interference from such a PAL, free of interference from other priority access licensees and general authorized access users. In one embodiment, an ability of a priority access licensee to operate free of interference shall be limited temporally, geographically, and spectrally within the specifications of its license.

General authorized access users shall have third, or lowest, priority to utilize the frequency spectrum controlled by the SAS. In one embodiment, an operation of GAA users will be governed by rules pertaining to the SAS, e.g. governmental laws and regulations and/or standards of standards bod(ies). For example, such rules shall only let GAA user(s) operate if the operating incumbent user(s) communications system(s) CBSDs are free from interference from the GAA user(s)' communications system(s). Also, for example, such rules shall only let a GAA user's CBSD operate as long as other CBSDs (authorized to operate at the same time) are free from interference from the GAA user's CBSD.

In one embodiment, the geographic coverage area and frequency spectrum controlled, at least in part, by the SAS control system 104 may include exclusion zones, protection zones, and grandfathered wireless protection zones. CBSDs are prohibited from operating in exclusion zones. Further, the level of interference generated, e.g. by all CBSDs shall be limited in protection zones so as not to interfere with certain incumbent user(s)' communications system(s) in the protection zones. To achieve this, the SAS control system 104 controls or regulates the operation of CBSDs proximate to protection zones. In some cases, this operation will be based upon information received by an environmental sensing capability (ESC) system, from an external database, and/or from a beacon (which will be subsequently described). One type of protection zone is the grandfathered wireless protection zone which is a geographic area and/or frequency spectrum where grandfathered wireless broadband licensees can operate free of interference, e.g. from CBSDs.

Figure 1C:
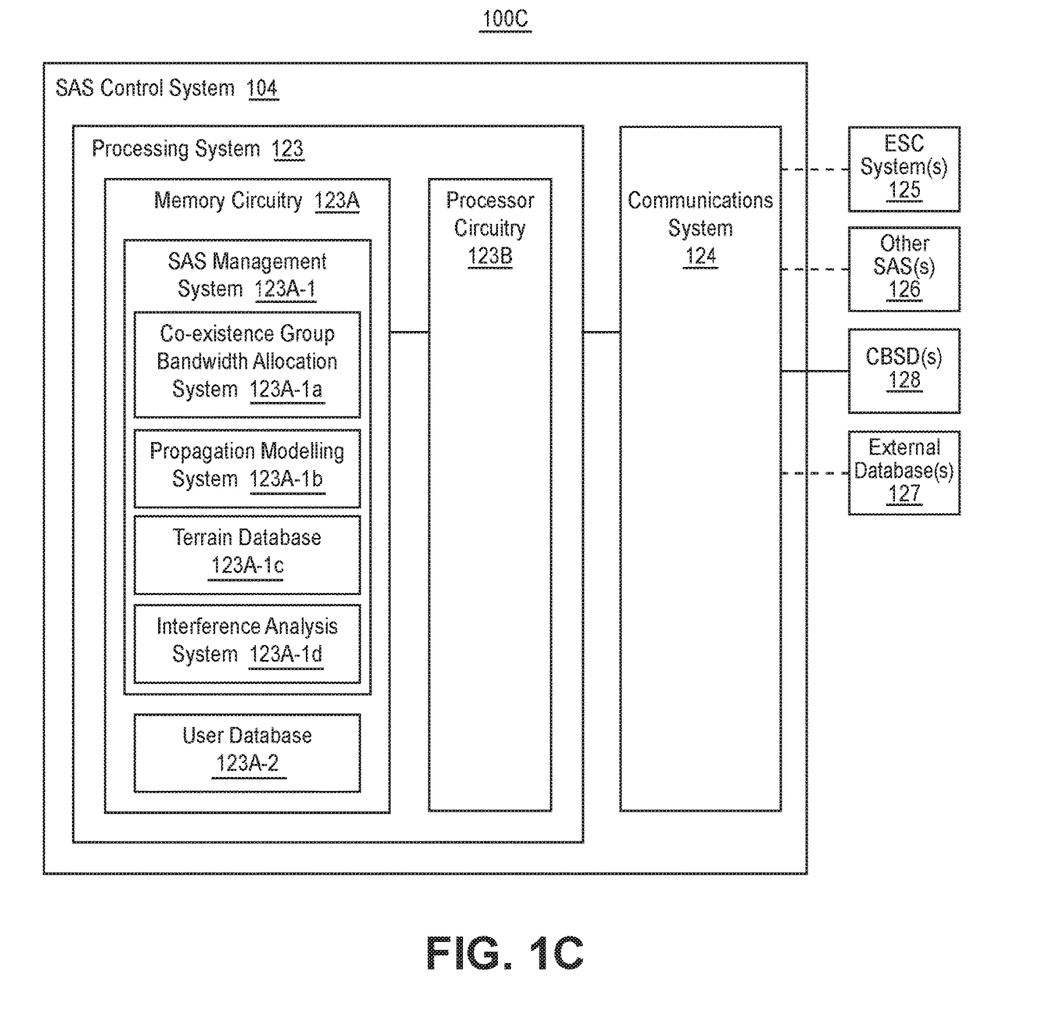
FIG. 1C illustrates a block diagram of one embodiment of a shared access system.

FIG. 1C illustrates a block diagram of one embodiment of a SAS 100C. The illustrated SAS 100C includes a SAS control system 104 coupled to one or more CBSDs 128. Each CBSD is operated by a GAA user and/or a PAL.

Optionally, the SAS control system 104 is coupled to at least one environmental sensing capability (ESC) system (ESC system(s)) 125. Optionally, the SAS control system 104 is coupled to external database(s) 127, e.g. which have information about when certain incumbent users' and/or PALs' communications systems (such as RADAR and/or satellite ground stations) are transmitting. The external database(s) 127 may also include without limitation: (a) databases, e.g. government databases (such as provided by the U.S. Federal Communications Commission), which store information about CBSD(s), priority access licensees (PALs), and/or incumbent users; and/or (b) databases, e.g. government databases (such as of the U.S. Geological Survey), storing information about terrain and other obstructions (e.g. buildings) and geographic morphology. In one embodiment, external databases that store terrain information store elevation data and/or geographic morphology data; such data for example may be stored substantially in a grid pattern, e.g. with data points separated by 30 m or 50 m. In another embodiment, such data is geodesic map data.

In a further embodiment, the SAS control system 104 is coupled to at least one other SAS (other SAS(s)) 126, e.g. operating in at least a portion of the same shared frequency spectrum. For example, CBSD(s) of the other SAS(s) 126 may generate electromagnetic energy that overlaps the geographic region of the SAS 101, and thus must be accounted for by the SAS control system 104 when the SAS control system 104 performs interference analysis and authorizes operation of CBSD(s) 128 of the PAL(s) and/or the GAA user(s). Alternatively, CBSD(s) of the SAS 100C may generate electromagnetic energy that overlaps the geographic region of the other SAS(s) 126, and thus must be accounted for by the other SAS(s) 126 when the other SAS(s) 126 perform interference analysis. By coupling SASs that are geographically proximate to one another, each SAS can account for electromagnetic energy emitted from proximate, other SASs.

The ESC system 125 detects, and communicates to the SAS control system 104, the presence of signal(s), e.g. from incumbent user(s)' communications system(s), such as RADAR. Alternatively, incumbent users can inform the SAS control system 104 that they are operating, e.g. by transmitting a signal beacon which may also be detected by the ESC system 125, or communicating with the external database(s) 127 coupled to the SAS control system 104. Upon notification of operation of an incumbent user, the SAS control system 104, at least in part, models the propagation of transmissions of the CBSD(s) 128 and regulates the operation (e.g. power levels and frequencies of operation) of the CBSD(s) 128 to allow the incumbent user(s)' communications systems to operate free of interference.

The SAS control system 104 also controls the operation (e.g. power levels and frequencies of operation) of GAA user(s)'s CBSD(s) so that PAL(s)'s CBSDs and GAA user(s) CBSD(s), authorized for operation by the SAS controller 104, operate free of interference.

In one embodiment, the SAS control system 104 includes a processing system 123 coupled to a communications system 124. The processing system 123, e.g. a state machine, controls the operation, in the shared frequency spectrum, of CBSD(s) 128 that form part of the SAS 100C.

The communications system 124 facilitates communications between the processing system 123 and other systems or devices, e.g. the CBSD(s) 128, the ESC system(s) 125, the external database(s) 127, and/or other SAS(s) 126. In one embodiment, the second communications system 124 includes a modem, e.g. an Internet data modem, and/or any other communications systems(s) that facilitate communications with the aforementioned systems. In one embodiment, the processing system 123 comprises processor circuitry 123B coupled to memory circuitry 123A.

In the illustrated embodiment, the memory circuitry 123A includes a SAS management system 123A-1 and a user database 123A-2. The user database 123A-2 includes information about geographic location, operating frequency spectrum, power output level of operation, modulation types, antenna radiation patterns, radiated power (or transmission) model(s), and/or maximum tolerable interference level of each CBSD included in the SAS 100C.

In the illustrated embodiment, the SAS management system 123A-1 includes a co-existence group bandwidth allocation system 123A-1a, a propagation modelling system 123A-1b, a terrain database 123A-1c, and an interference analysis system 123A-1d. The co-existence group bandwidth allocation system 123A-1a determines the bandwidth allocated to each co-existence group that forms part of the SAS using one of the techniques described herein.

The interference analysis system 123A-1d analyzes interference at CBSDs, and/or incumbent user(s) communications system(s) as otherwise described herein. The interference analysis system 123A-1d may utilize the propagation modelling system 123-1b, the terrain database 123A-1c, and/or the user database 123A-2 to perform its functions. The terrain database 123A-1c may store terrain and/or obstruction, and/or morphology data, e.g. obtained from the external database(s) 127.

The propagation modelling system 123-1b estimates electromagnetic energy radiated by a CBSD at geographic location(s) and/or over geographic region(s). The propagation modelling system 123-1b may include an irregular terrain propagation path loss model.

Figure 2:
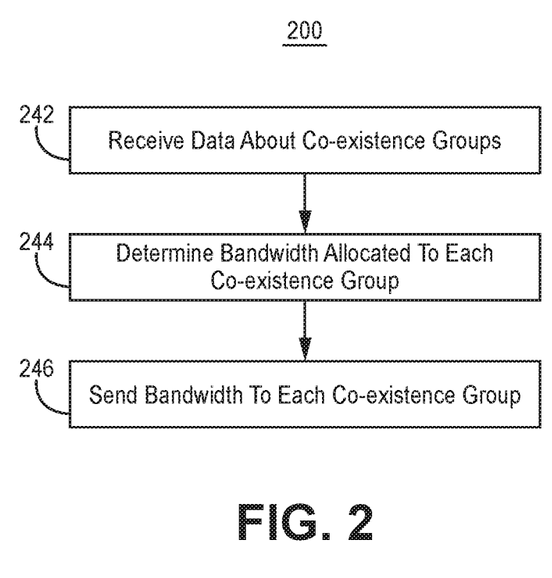
FIG. 2 illustrates one embodiment of a method of allocating bandwidth to co-existence groups in a connected set of a shared access system.

FIG. 2 illustrates one embodiment of a method of allocating bandwidth to co-existence groups in a connected set of a shared access system 200. To the extent the method 200 shown in FIG. 2 is described herein as being implemented in the systems shown in FIGS. 1A through 1C, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 242, receive data about co-existence groups in a connected set. Such data about co-existence groups includes the number of co-existence groups, and the number of CBSDs in each co-existence group. Optionally, such data may be dynamically received as co-existence groups are added or removed from the connected set (e.g. removed from the SAS), and/or as the number of CBSDs in co-existence groups of the connected set changes.

In block 244, determine bandwidth allocated to each co-existence group in the connected set. Such calculation may be made in a single calculation. Optionally, determine for each co-existence group, the co-existence incentive bandwidth and the group splitting disincentive bandwidth. Then, determine the bandwidth allocated to each co-existence group by subtracting the group splitting disincentive bandwidth from the corresponding co-existence incentive bandwidth. Optionally, use one of Equations 1, 2 or 4 above to determine the bandwidth allocated to each co-existence group, or the co-existence incentive bandwidth and the group splitting disincentive bandwidth. Optionally, if the determined bandwidth allocated to a co-existence group is less then a minimum bandwidth (e.g. of 5 MHz or 10 MHz), then the determined bandwidth is changed to equal the defined minimum bandwidth. The minimum bandwidth may be set, for example, by a standards body, e.g. of the SAS or RAT of the corresponding CBSDs in the co-existence group.

In block 246, send each determined allocated bandwidth to a corresponding co-existence group in the connected set (send bandwidth to each co-existence group). In one embodiment, send each determined allocated bandwidth to the CBSD(s) in the corresponding co-existence group. Optionally, perform blocks 242, and/or 244 and 246 any time the number of co-existence groups in the connected set changes and/or any time the number of CBSDs in any co-existence group or the connected set changes.

The processor circuitry 123B may include one or more microprocessors, microcontrollers, digital signal processing (DSP) elements, application-specific integrated circuits (ASICs), and/or field programmable gate arrays (FPGAs). The processor circuitry 123B may include or function with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry 123A can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, Blu-Ray discs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory.

Methods of the invention can be implemented in computer readable instructions, such as program modules or applications, which may be stored in the computer readable medium and executed by the processing circuitry 123B. Generally, program modules or applications include routines, programs, objects, data components, data structures, algorithms, and the like, which perform particular tasks or implement particular abstract data types.

Databases as used herein may be either conventional databases or data storage formats of any type, e.g. data files. Although separate databases are recited herein, one or more of such databases may be combined.

Example Embodiments

Example 1 is a method of allocating bandwidth to co-existence groups of a connected set in a spectrum access system (SAS), comprising: receiving data about co-existence groups in the connected set of the SAS, where such data includes a number of the co-existence groups, G, in the connected set, and a number of radios, $n_i$, in each co-existence group; determining an allocated bandwidth for each of the G co-existence group by subtracting a splitting disincentive bandwidth for a co-existence group from a co-existence incentive bandwidth for the co-existence group; and sending the determined allocated bandwidths for the co-existence groups.

Example 2 includes the method of Example 1, wherein determining the allocated bandwidth for each co-existence group comprises determining:

$$B_i = \left[\frac{B}{G}\right] - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left[\frac{B}{G}\right]$$

is a co-existence incentive bandwidth, $B_g$ is a total guard bandwidth, N is a total number of radios in the connected set, and $$\left[B_g * \left\{\frac{2}{G} - \frac{n_i}{N}\right\}\right]$$

is an ith co-existence group splitting disincentive bandwidth.

Example 3 includes the method of any of Examples 1-2, wherein determining the allocated bandwidth for each co-existence group comprises determining:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left\{\frac{B}{G} * w1 + \left(B * \frac{A_i}{A}\right) * w2\right\}$$

is an ith co-existence group splitting incentive bandwidth, $A_i$ is a coverage area of the ith coexistence group; $A=\Sigma_1^G A_i$, where A is a total coverage area of all coexistence groups in the connected set, w1 is a first weighting factor, w2 is a second weighting factor, w1+w2=1, $B_g$ is a total guard bandwidth, N is a total number of radios in the connected set, and $$\left[B_g * \left\{\frac{2}{G} - \frac{n_i}{N}\right\}\right]$$

is an ith co-existence group splitting disincentive bandwidth.

Example 4 includes the method of any of Examples 1-3, wherein if $B_i$ is determined to be less than a minimum bandwidth, $B_{min}$, then $B_i=B_{min}$.

Example 5 includes the method of any of Examples 1-4, wherein receiving data about co-existence groups in the connected set of the SAS comprises dynamically receiving data about co-existence groups as at least one of: at least one co-existence group is added or removed from a connected set, and a number of radios in a co-existence group changes.

Example 6 includes the method of any of Examples 1-5, wherein receiving data about the co-existence groups in the connected set of the SAS comprises receiving data about the co-existence groups in the connected set of the SAS, where at least one co-existence group in the connected set has a radio access technology different from a radio access technology of at least one other co-existence group in the connected set.

Example 7 includes a non-transitory computer readable medium storing a program causing a computer to perform a method to allocate bandwidth to co-existence groups of a connected set in a spectrum access system (SAS), the method comprising: receiving data about co-existence groups in the connected set of the SAS, where such data includes a number of the co-existence groups, G, in the connected set, and a number of radios, $n_i$, in each co-existence group; determining an allocated bandwidth for each of the G co-existence group by subtracting a splitting disincentive bandwidth for a co-existence group from a co-existence incentive bandwidth for the co-existence group; and sending the determined allocated bandwidths for the co-existence groups.

Example 8 includes the non-transitory computer readable medium of Example 7, wherein determining the allocated bandwidth for each co-existence group comprises determining:

$$B_i = \left[\frac{B}{G}\right] - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left[\frac{B}{G}\right]$$

is a co-existence incentive bandwidth, $B_g$ is a total guard bandwidth, N is a total number of radios in the connected set, and $$\left[B_g * \left\{\frac{2}{G} - \frac{n_i}{N}\right\}\right]$$

is an ith co-existence group splitting disincentive bandwidth.

Example 9 includes the nontransitory computer readable medium of any of Examples 7-8, wherein determining the allocated bandwidth for each co-existence group comprises determining:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left\{\frac{B}{G} * w1 + \left(B * \frac{A_i}{A}\right) * w2\right\}$$

is an ith co-existence group splitting incentive bandwidth, $A_i$ is a coverage area of the ith coexistence group; $A=\Sigma_1^G A_i$, where A is a total coverage area of all coexistence groups in the connected set, w1 is a first weighting factor, w2 is a second weighting factor, w1+w2=1, $B_g$ is a total guard bandwidth, N is a total number of radios in the connected set, and $$\left[B_g * \left\{\frac{2}{G} - \frac{n_i}{N}\right\}\right]$$

is an ith co-existence group splitting disincentive bandwidth.

Example 10 includes the non-transitory computer readable medium of any of Examples 7-8, wherein if $B_i$ is determined to be less than a minimum bandwidth, $B_{min}$, then $B_i=B_{min}$.

Example 11 includes the non-transitory computer readable medium of any of Examples 7-9, wherein receiving data about co-existence groups in the connected set of the SAS comprises dynamically receiving data about co-existence groups as at least one of: at least one co-existence group is added or removed from a connected set, and a number of radios in a co-existence group changes.

Example 12 includes the non-transitory computer readable medium of any of Examples 7-11, wherein receiving data about the co-existence groups in the connected set of the SAS comprises receiving data about the co-existence groups in the connected set of the SAS, where at least one co-existence group in the connected set has a radio access technology different from a radio access technology of at least one other co-existence group in the connected set.

Example 13 includes a spectrum access system (SAS), comprising: a processing system comprising processing circuitry coupled to memory circuitry; a communications system coupled to the processing system; radios coupled to the communications system; wherein the processing system is configured to allocate bandwidth to co-existence groups of a connected set in the SAS by: receiving data about co-existence groups in the connected set of the SAS, where such data includes a number of the co-existence groups, G, in the connected set, and a number of radios, $n_i$, in each co-existence group; determining an allocated bandwidth for each of the G co-existence group by subtracting a splitting disincentive bandwidth for a co-existence group from a co-existence incentive bandwidth for the co-existence group; and sending the determined allocated bandwidths for the co-existence groups.

Example 14 includes the system of Example 13, wherein determining the allocated bandwidth for each co-existence group comprises determining:

$$B_i = \left[\frac{B}{G}\right] - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left[\frac{B}{G}\right]$$

is a co-existence incentive bandwidth, $B_g$ is a total guard bandwidth, N is a total number of radios in the connected set, and $$\left[B_g * \left\{\frac{2}{G} - \frac{n_i}{N}\right\}\right]$$

is an ith co-existence group splitting disincentive bandwidth.

Example 15 includes the system of any of Examples 13-14, wherein determining the allocated bandwidth for each co-existence group comprises determining:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right],$$

wherein determining the allocated bandwidth for each co-existence group comprises determining:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left\{\frac{B}{G} * w1 + \left(B * \frac{A_i}{A}\right) * w2\right\}$$

is an ith co-existence group splitting incentive bandwidth, $A_i$ is a coverage area of the ith coexistence group; $A=\Sigma_1^G A_i$, where A is a total coverage area of all coexistence groups in the connected set, w1 is a first weighting factor, w2 is a second weighting factor, w1+w2=1, $B_g$ is a total guard bandwidth, N is a total number of radios in the connected set, and $$\left[B_g * \left\{\frac{2}{G} - \frac{n_i}{N}\right\}\right]$$

is an ith co-existence group splitting disincentive bandwidth.

Example 16 includes the system of any of Examples 13-15, wherein if $B_i$ is determined to be less than a minimum bandwidth, $B_{min}$, then $B_i=B_{min}$.

Example 17 includes the system of any of Examples 13-16, wherein receiving data about co-existence groups in the connected set of the SAS comprises dynamically receiving data about co-existence groups as at least one of: at least one co-existence group is added or removed from a connected set, and a number of radios in a co-existence group changes.

Example 18 includes the system of any of Examples 13-17, wherein receiving data about the co-existence groups in the connected set of the SAS comprises receiving data about the co-existence groups in the connected set of the SAS, where at least one co-existence group in the connected set has a radio access technology different from a radio access technology of at least one other co-existence group in the connected set.

Example 19 includes the system of any of Examples 13-18, wherein the SAS is coupled to at least one of: at least one environmental sensing capability system, and at least one external database.

Example 20 includes the system of any of Examples 13-19, wherein the SAS is coupled to at least one other SAS.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method of allocating bandwidth to co-existence groups of a connected set in a spectrum access system (SAS), comprising:
   receiving data about co-existence groups in the connected set of the SAS, where such data includes a number of the co-existence groups, G, in the connected set, and a number of radios, $n_i$, in each co-existence group, where a co-existence group consists of a group of radios which are operated using an interference management policy to mitigate interference amongst the radios in the co-existence group;
   determining an allocated bandwidth for each of the G co-existence group by subtracting a splitting disincentive bandwidth for a co-existence group from a co-existence incentive bandwidth for the co-existence group, where a splitting disincentive bandwidth for a co-existence group is a function of at least a number of radios in the co-existence bandwidth; and
   sending the determined allocated bandwidths for the co-existence groups.

2. The method of claim 1, wherein determining the allocated bandwidth for each co-existence group comprises determining:

$$B_i = \left[\frac{B}{G}\right] - \left[B_g * \left\{\frac{2}{G} - \frac{n_i}{N}\right\}\right],$$

where $B_i$ is an allocated bandwidth for an ith co-existence group,
$B=\Sigma_1^G B_i$, where B is a total bandwidth available to all co-existence groups in the connected set, $$\left[\frac{B}{G}\right]$$

is a co-existence incentive bandwidth,
$B_g$ is a total guard bandwidth,
N is a total number of radios in the connected set, and $$\left[B_g * \left\{\frac{2}{G} - \frac{n_i}{N}\right\}\right]$$

is an ith co-existence group splitting disincentive bandwidth.

3. The method of claim 1, wherein determining the allocated bandwidth for each co-existence group comprises determining:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right],$$

where $B_i$ is an allocated bandwidth for an ith co-existence group,
$B=\Sigma_1^G B_i$, where B is a total bandwidth available to all co-existence groups in the connected set, $$\left\{\frac{B}{G} * w1 + \left(B * \frac{A_i}{A}\right) * w2\right\}$$

is an ith co-existence group splitting incentive bandwidth,
$A_i$ is a coverage area of the ith coexistence group;
$A=\Sigma_1^G A_i$, where A is a total coverage area of all coexistence groups in the connected set,
w1 is a first weighting factor,
w2 is a second weighting factor,
w1+w2=1,
$B_g$ is a total guard bandwidth,
N is a total number of radios in the connected set, and $$\left[B_g * \left\{\frac{2}{G} - \frac{n_i}{N}\right\}\right]$$

is an ith co-existence group splitting disincentive bandwidth.

4. The method of claim 1, wherein if an allocated bandwidth for an ith co-existence group, $B_i$, is determined to be less than a minimum bandwidth, $B_{min}$, then change $B_i$ to equal $B_{min}$.

5. The method of claim 1, wherein receiving data about co-existence groups in the connected set of the SAS comprises dynamically receiving data about co-existence groups as at least one of: at least one co-existence group is added or removed from a connected set, and a number of radios in a co-existence group changes.

6. The method of claim 1, wherein receiving data about the co-existence groups in the connected set of the SAS comprises receiving data about the co-existence groups in the connected set of the SAS, where at least one co-existence group in the connected set has a radio access technology different from a radio access technology of at least one other co-existence group in the connected set.

7. A non-transitory computer readable medium storing a program causing a computer to perform a method to allocate bandwidth to co-existence groups of a connected set in a spectrum access system (SAS), the method comprising:
   receiving data about co-existence groups in the connected set of the SAS, where such data includes a number of the co-existence groups, G, in the connected set, and a number of radios, $n_i$, in each co-existence group, where a co-existence group consists of a group of radios which are operated using an interference management policy to mitigate interference amongst the radios in the co-existence group;
   determining an allocated bandwidth for each of the G co-existence group by subtracting a splitting disincentive bandwidth for a co-existence group from a co-existence incentive bandwidth for the co-existence group, where a splitting disincentive bandwidth for a co-existence group is a function of at least a number of radios in the co-existence bandwidth; and
   sending the determined allocated bandwidths for the co-existence groups.

8. The non-transitory computer readable medium of claim 7, wherein determining the allocated bandwidth for each co-existence group comprises determining:

$$B_i = \left[\frac{B}{G}\right] - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left[\frac{B}{G}\right]$$

is a co-existence incentive bandwidth,
$B_g$ is a total guard bandwidth,
N is a total number of radios in the connected set, and $$\left[B_g * \left\{\frac{2}{G} - \frac{n_i}{N}\right\}\right]$$

is an ith co-existence group splitting disincentive bandwidth.

9. The non-transitory computer readable medium of claim 7, wherein determining the allocated bandwidth for each co-existence group comprises determining:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left\{\frac{B}{G} * w1 + \left(B * \frac{A_i}{A}\right) * w2\right\}$$

is an ith co-existence group splitting incentive bandwidth,
$A_i$ is a coverage area of the ith coexistence group;
$A=\Sigma_1^G A_i$, where A is a total coverage area of all coexistence groups in the connected set,
w1 is a first weighting factor,
w2 is a second weighting factor,
w1+w2=1,
B is a total guard bandwidth,
N is a total number of radios in the connected set, and $$\left[B_g * \left\{\frac{2}{G} - \frac{n_i}{N}\right\}\right]$$

is an ith co-existence group splitting disincentive bandwidth.

10. The non-transitory computer readable medium of claim 7, wherein if an allocated bandwidth for an ith co-existence group, $B_i$, is determined to be less than a minimum bandwidth, $B_{min}$, then change $B_i$ to equal $B_{min}$.

11. The non-transitory computer readable medium of claim 7, wherein receiving data about co-existence groups in the connected set of the SAS comprises dynamically receiving data about co-existence groups as at least one of: at least one co-existence group is added or removed from a connected set, and a number of radios in a co-existence group changes.

12. The non-transitory computer readable medium of claim 7, wherein receiving data about the co-existence groups in the connected set of the SAS comprises receiving data about the co-existence groups in the connected set of the SAS, where at least one co-existence group in the connected set has a radio access technology different from a radio access technology of at least one other co-existence group in the connected set.

13. A spectrum access system (SAS), comprising:
a processing circuitry comprising processing circuitry coupled to memory circuitry;
a communications system coupled to the processing circuitry;
radios coupled to the communications system;
wherein the processing circuitry is configured to allocate bandwidth to co-existence groups of a connected set in the SAS by:
receiving data about co-existence groups in the connected set of the SAS, where such data includes a number of the co-existence groups, G, in the connected set, and a number of radios, $n_i$, in each co-existence group, where a co-existence group consists of a group of radios which are operated using an interference management policy to mitigate interference amongst the radios in the co-existence group;
determining an allocated bandwidth for each of the G co-existence group by subtracting a splitting disincentive bandwidth for a co-existence group from a co-existence incentive bandwidth for the co-existence group, where a splitting disincentive bandwidth for a co-existence group is a function of at least a number of radios in the co-existence bandwidth; and
sending the determined allocated bandwidths for the co-existence groups.

14. The system of claim 13, wherein determining the allocated bandwidth for each co-existence group comprises determining:

$$B_i = \left[\frac{B}{G}\right] - \left[B_g * \left\{\frac{2}{G} - \frac{n_i}{N}\right\}\right],$$

where $B_i$ is an allocated bandwidth for an ith co-existence group, $B=\Sigma_1^G B_i$, where B is a total bandwidth available to all co-existence groups in the connected set, $$\left[\frac{B}{G}\right]$$

is a co-existence incentive bandwidth,
$B_g$ is a total guard bandwidth,
N is a total number of radios in the connected set, and $$\left[B_g * \left\{\frac{2}{G} - \frac{n_i}{N}\right\}\right]$$

is an ith co-existence group splitting disincentive bandwidth.

15. The system of claim 13, wherein determining the allocated bandwidth for each co-existence group comprises determining:

$$B_i = \left\{\frac{B}{G} * w1 + \left(B * \frac{A_i}{A}\right) * w2\right\} - \left[B_g * \left\{\frac{2}{G} - \frac{n_i}{N}\right\}\right],$$

wherein determining the allocated bandwidth for each co-existence group comprises determining:

$$B_i = \left\{\frac{B}{G}*w1 + \left(B*\frac{A_i}{A}\right)*w2\right\} - \left[B_g*\left\{\frac{2}{G} - \frac{n_i}{N}\right\}\right],$$

where $B_i$ is an allocated bandwidth for an ith co-existence group, $B = \Sigma_1^G B_i$, where B is a total bandwidth available to all co-existence groups in the connected set, $$\left\{\frac{B}{G}*w1 + \left(B*\frac{A_i}{A}\right)*w2\right\}$$

is an ith co-existence group splitting incentive bandwidth, $A_i$ is a coverage area of the ith coexistence group;

$A = \Sigma_1^G A_i$, where A is a total coverage area of all coexistence groups in the connected set, w1 is a first weighting factor, w2 is a second weighting factor, w1+w2=1, $B_g$ is a total guard bandwidth, N is a total number of radios in the connected set, and $$\left[B_g*\left\{\frac{2}{G} - \frac{n_i}{N}\right\}\right]$$

is an ith co-existence group splitting disincentive bandwidth.

16. The system of claim 13, wherein if an allocated bandwidth for an ith co-existence group, $B_i$, is determined to be less than a minimum bandwidth, $B_{min}$, then change $B_i$ to equal $B_{min}$.

17. The system of claim 13, wherein receiving data about co-existence groups in the connected set of the SAS comprises dynamically receiving data about co-existence groups as at least one of: at least one co-existence group is added or removed from a connected set, and a number of radios in a co-existence group changes.

18. The system of claim 13, wherein receiving data about the co-existence groups in the connected set of the SAS comprises receiving data about the co-existence groups in the connected set of the SAS, where at least one co-existence group in the connected set has a radio access technology different from a radio access technology of at least one other co-existence group in the connected set.

19. The system of claim 13, wherein the SAS is coupled to at least one of: at least one environmental sensing capability system, and at least one external database.

20. The system of claim 13, wherein the SAS is coupled to at least one other SAS.

* * * * *